United States Patent

[11] 3,580,505

[72] Inventor Herbert V. Loeffler
 Rte #2 & 71 By-Pass, Lee's Summit, Mo. 64063
[21] Appl. No. 817,437
[22] Filed Apr. 18, 1969
[45] Patented May 25, 1971

[54] SPRAYER BOOM ASSEMBLY
 8 Claims, 5 Drawing Figs.
[52] U.S. Cl. .......................................... 239/168
[51] Int. Cl. .......................................... B05b 1/20
[50] Field of Search .......................................... 239/159,
 161, 166, 167, 168, 164; 280/6; 180/4

[56] References Cited
 UNITED STATES PATENTS

| | | | |
|---|---|---|---|
| 2,221,433 | 11/1940 | Pitner | 239/168 |
| 2,305,913 | 12/1942 | Troyer | 239/168 |
| 3,223,330 | 12/1965 | La Plante | 239/168 |
| 3,395,503 | 8/1968 | Greenburg et al. | 239/164 |

FOREIGN PATENTS 1,298,775  5/1967  Germany................. 239/159

*Primary Examiner*—M. Henson Wood, Jr.
*Assistant Examiner*—Edwin D. Grant
*Attorney*—John A. Hamilton ABSTRACT: A sprayer boom assembly adapted to be mounted on a truck or other vehicle and including an elongated boom having a spray nozzles spaced therealong, said boom being disposed horizontally and transversely of the vehicle, extending outwardly at both sides of the vehicle, and including a central boom section suspended from the vehicle on a fore-and-aft axis by resiliently yieldable means whereby to remain generally horizontal when the vehicle tilts laterally, a pair of outer boom sections each pivoted for vertical movement to the contiguous end of said central section, and flexible strand supporting each of said outer boom sections in a normally horizontal position, and said strands being connected to said vehicle at points above the pivots of said outer boom sections.

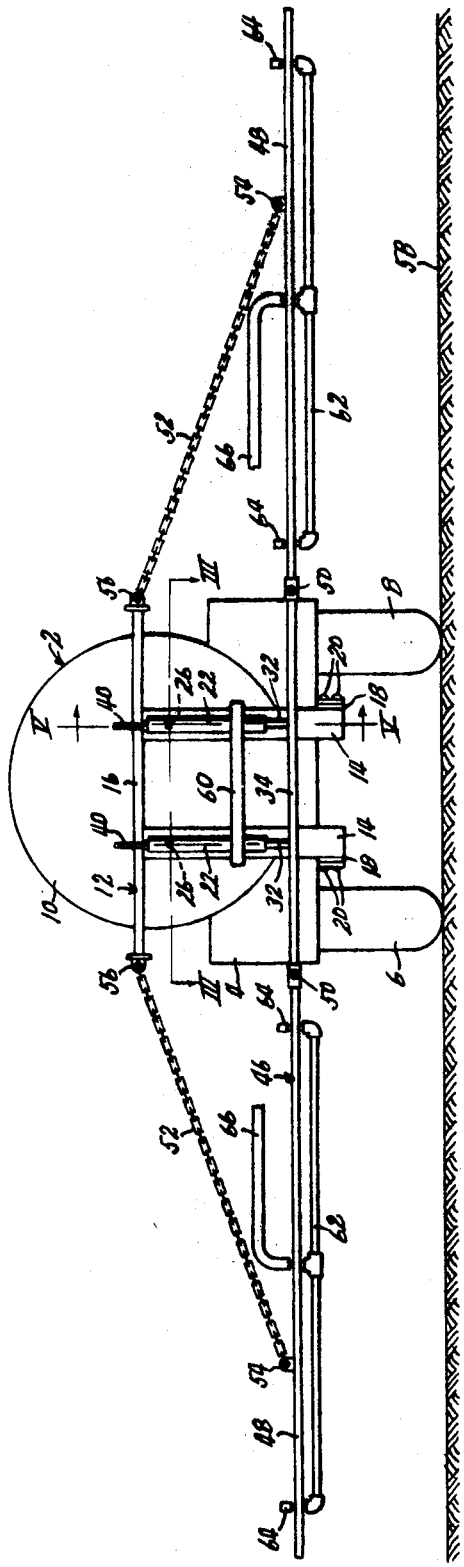

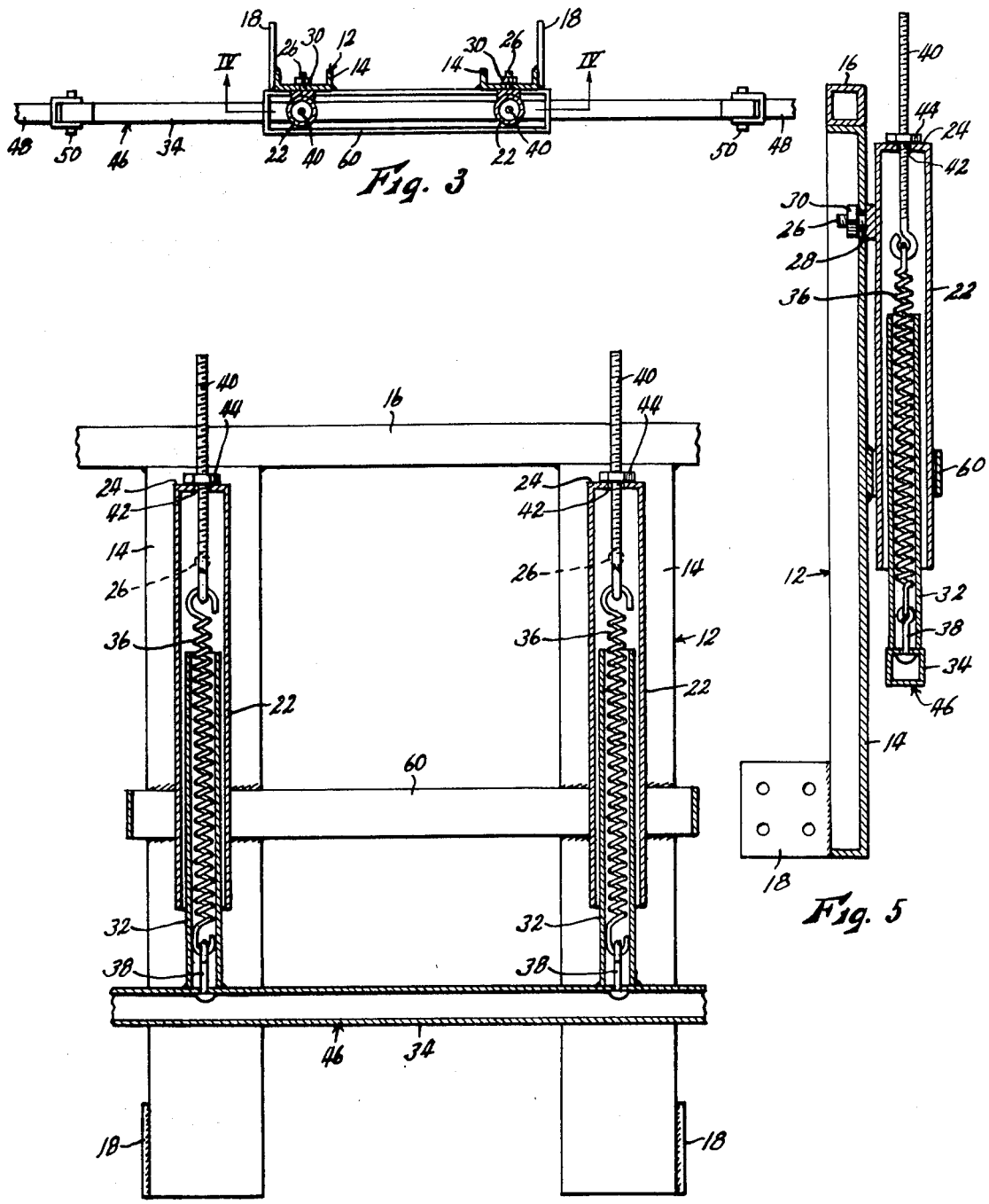

SPRAYER BOOM ASSEMBLY

This invention relates to new and useful improvements in sprayer boom assemblies, and has particular reference to sprayer boom assemblies of the type used for applying liquid fertilizers, insecticides or other liquid chemicals to the ground or to crops in agricultural operations.

In this type of operation in general, a truck or other vehicle having a tank of the liquid chemical mounted thereon has a horizontal boom fixedly mounted thereon and extending transversely of the vehicle, usually at the rear of said vehicle, said boom carrying spray beads at intervals therealong, to which the liquid chemicals are delivered by suitable pumping means, whereby the chemicals are distributed evenly as the vehicle is driven over the ground. Also, to increase the ground area treated by a single pass of the vehicle across a field, it has become common practice to pivot a boom extension to each end of the fixed boom, to increase the span of the boom laterally of the vehicle. Booms extend in this manner to provide a span of 30 to 40 feet are common. The extensions are pivoted for vertical movement, in order that they may be folded upwardly for convenient transportation from field to field, but when in use are suspended to form horizontal extensions of the fixed boom section by members such as chains extending thereto from points fixed relative to the vehicle. This type of articulated boom, with its central section fixed on the vehicle, has been found generally satisfactory on ground which is smooth and level, but is subject to two general objectionable features of operation when the ground is rough, uneven or slopes laterally to the line of travel of the vehicle.

First, if the ground is rough, the shocks transmitted through the truck to the boom may result in uncontrolled vertical swinging of the outer extensions of the boom. For example, if the vehicle wheels should strike rocks or other obstructions, delivering an upward shock to the truck and the boom, the outer boom sections may continue upwardly by inertia, introducing slack into their suspending chains. Then, when the outer boom sections eventually fall by gravity, they may again "bounce" upwardly, assisted by lateral "whipping" action of the chains supporting them. Depending on the periodicity of shocks delivered to the truck by the rough terrain, this vertical oscillating or bounding of the outer boom sections may build to excessive proportions resulting in uneven application of the liquid chemical to the ground, or in breakage of or damage to the boom. Accordingly, one of the primary objects of the present invention is the provision of a shock-absorbing suspension for a boom assembly of the general character described, whereby the described vertical oscillation of the outer boom sections is largely eliminated. Generally, this object is accomplished by suspending the central boom section resiliently from the truck, and suspending the outer boom sections by chains attached thereto outwardly from their centers of gravity.

A second general difficulty encountered with articulated booms having central sections rigidly affixed to the truck is the tendency of the outer ends of the boom extensions to dig into the ground when the truck tilts laterally to its line of travel. Such tilting of the truck may occur either on evenly sloping ground, as when the truck is moving across sloping ground transversely to the pitch thereof, or as a result of localized irregularities in the ground surface which do not represent a change in the general slope. As long as the ground slope is regular and even, it is perhaps most desirable that the boom remain in fixed relationship to the truck, since in this manner it is caused to remain parallel to the ground line therebeneath, but if it does remain fixed relative to the truck and the truck tilts laterally due to a localized irregularity in the ground surface, the boom end at the "low" side of the truck may dig into the ground. Therefore for localized irregularities of the ground surface, it is perhaps most desirable that the boom remain horizontal regardless of lateral tilting of the truck, so as to remain horizontal regardless of lateral tilting of the truck, so as to remain horizontal and parallel to the general ground line. This could be done, for example, by suspending the boom from the truck by means of a pivot linkage, so as to remain horizontal as the truck tilts. However, if the boom were so suspended, adapting it for use on level ground with only localized irregularities, and the truck were driven on ground with a smooth, even slop, then the boom end at the "high" side of the truck might be caused to dig into the ground. Accordingly, a second prime object of the present invention is the provision of a boom assembly including a suspension system such that when the truck is tilted laterally, the outer end of the boom at the low side is elevated, and the outer end of the boom at the high side is lowered, as compared to the positions they would have occupied if the boom had remained fixed relative to the truck, but to a lesser degree than they would have been respectively elevated and lowered if the boom had been suspended to remain horizontal despite tilting of the truck. Thus, within an acceptable limits representing a major improvement over existing assemblies, both ends of the boom are maintained above ground level, and damage thereby avoided, regardless of whether the tilting of the truck resulted from a change of general slop or from localized irregularities of the ground.

With these objects in view, as well as other objects which will appear in the course of the specification, reference will be had to the accompanying drawing, wherein:

FIG. 1 is a rear elevational view of a sprayer truck having a sprayer boom assembly embodying the present invention mounted operatively thereon.

FIG. 2 is a view similar to FIG. 1, showing the position assumed by the boom when the truck is transversely tilted, FIG. 3 is an enlarged, fragmentary sectional view of the boom assembly taken on line III–III of FIG. 1, FIG. 4 is an enlarged, fragmentary sectional view taken on line IV–IV of FIG. 3; and FIG. 5 is an enlarged sectional view of the boom assembly taken on line V–V of FIG. 1.

Life reference numerals apply to similar parts throughout the several views, and the numeral 2 applies generally to a sprayer truck, shown in rear elevation in FIGS. 1 and 2 of a type to which the sprayer boom assembly of the present invention may be applied. Said truck includes a body 4 supported by the usual ground engaging wheels, the rear wheels being indicated at 6 and 8, and carrying a tank 10 containing the fertilizer, insecticide or other liquid chemical to be applied to the ground, or to crops growing in the ground.

The boom assembly forming the subject matter of the present invention includes a frame indicated generally by the numeral 12 consisting of a pair of spaced apart vertical uprights 14 adapted to be disposed at the rear of truck 2, spaced apart laterally of said truck, and a horizontal cross bar 16 affixed to the upper ends of uprights 14 and also extending laterally of the truck, having a length about equal to the width of the truck. At its lower end, each upright 14 is provided with a bracket 18 affixed thereto, and which is in turn adapted to be affixed as by bolts 20 to any convenient portion of the truck, whereby the frame is affixed rigidly to the truck.

A normally vertical tubular guide 22, closed at its upper end by wall 24 but open at its lower end, is disposed immediately behind each of upright 14, and is pivoted to said upright, adjacent the upper end of both on a horizontal axis extending fore-and-aft of truck 2, by means of a pivot bolt 26 affixed to said guide, extending forwardly through a hole 28 provided therefor in upright 14, and secured by a nut 30. A second tubular guide 32 is telescoped slidably and loosely into each of guides 22, and extends downwardly from the lower end thereof, guides 32 being rigidly affixed at their lower ends to a central boom section 34 constituting a horizontal bar extending transversely of truck 2, and being of about the same length as cross bar 16 of the frame. Disposed in each of the composite guides 22—32 is a helical tension spring 36, said spring being connected at its lower end to an eye member 38 fixed in boom section 34, and at its upper end to a vertical eyebolt 40 which extends upwardly through a hole 42 provided therefor in end wall 24 of guide 22, and has a nut 44 threaded thereon above said end wall.

The boom proper, designated generally by the numeral 46, includes central section 34, already mentioned, and which generally spans the width of truck 2, and a pair of end sections 48 pivoted respectively to the opposite ends of central section 34 and extending laterally outwardly from the truck in respectively opposite directions. The pivotal connection of each end boom section 48 to central section 34 is indicated at 50, and the axis thereof is horizontal and extends fore-and-aft of the truck, whereby said end boom sections may pivot vertically. Each end boom section is supported by a chain 52 or the like connected at one end to said end boom section more than half of its length from its pivot 50, as at 54, said chain being inclined inwardly and upwardly and connected at its opposite end to the adjacent end of cross bar 16, as at 56. Said chains are of such length that when the truck and central boom section are level and horizontal, as shown in FIG. 1, end boom sections 48 form linear extensions of the central section. With the truck in this position the entire boom can be leveled and made parallel to the ground line 58 by turning nuts 44 on eyebolts 40. Lateral swinging of guides 22 on pivot bolts 26 is limited by a hoop 60 welded to uprights 14 and enclosing guides 22 therein, as best shown in FIG. 3.

Each end or outer boom section 48, as shown, carries a pipe header 62 to which are connected a plurality of spray nozzles 64, each adapted to emit a spray of liquid fertilizer or other chemical. Central boom section 34 could also carry spray nozzles if desired. Each header 62 is interconnected by means of a flexible hose 66 to tank 10 of the truck through suitable pumping and valving means, not shown but well understood in the art. The flexibility of these hoses permits vertical pivoting of outer boom sections 48, either to fold said sections up to generally vertical positions for convenient roadway travel of the truck, or to permit lesser degrees of pivoting in actual use, as will be fully described below.

In use, it will be seen that as long as the ground 58 is smooth and level as shown in FIG. 1, the entire boom 46, supported by springs 36 and chains 52, will remain straight and parallel with the ground. In fact, as long as the ground is smooth and level the boom would function efficiently even without the special provisions of the present invention, but with the boom mounted as in the prior art. This prior art mounting may be characterized generally as the same as that shown here with the exception that central boom section 34 is attached rigidly and permanently either to frame 12, or directly to truck 2. However, as already described, the prior art structure is subject to certain malfunctions if the ground over which the truck is being driven is rough, uneven or sloping in a direction lateral to the truck.

First, if the ground is generally rough but not such as to tilt the truck appreciably, the vertical shocks delivered to the boom through its suspension often results in uncontrolled and sometimes extreme vertical oscillation of the outer boom sections 48, as already described. In the present structure, this vertical oscillation of the outer boom sections is dampened and largely eliminated by the shock-absorbing effect of springs 36. That is, if the wheels of the truck should strike a rock or raises irregularity of the ground, causing a sharp upward movement of or upward jolt to the truck, central boom section 34 tends by its inertia to remain at a lower position, causing resilient extension of springs 36, while during a downward jolt, such as might occur if the vehicle wheels drop into a ditch or other depression, boom section 34 tends to remain elevated and springs 36 to contract. Springs 36 thus oscillate vertically after a vertical shock and dampen the transmission of the vertical shock to the outer boom sections, and thus largely eliminate any tendency of the outer boom section to oscillate on pivots 50. Outer boom sections 48 are of course partially supported by chains 52, which are in turn attached at 56 directly to the truck, or to the frame 12 affixed to truck. Thus vertical jolts to the truck, at least upward jolts, are transmitted by said chains to the outer boom sections. Nevertheless, these chain-transmitted jolts do not result in upward swinging of the outer boom sections 48 on pivots 50 in the sense that chains 52 go slack. Instead, the chains remain essentially taut, and the outer boom sections follow and are dominated by the motion of central boom section 34, so long as a major portion of the weight of the outer boom sections is supported by springs 36, not by chains 52. This distribution of the weight of the outer boom sections is provided by positioning the attaching points 54 of the chains outwardly from the midpoints of said outer boom sections. If points 54 were positioned inwardly from the midpoints of boom sections 48 a major portion of the weight of said boom sections would be supported by chains 52, and upward shocks delivered thereto by the chains would have a greater tendency to swing them upwardly about pivots 50 by inertia, even though still to a lesser degree than if central boom section 34 were rigid on the truck. Thus, on rough ground central boom section 34 will bob upwardly and downwardly on springs 36, but this does no harm, and chains 52 will remain generally taut, so that very little if any uncontrolled oscillation of boom sections 48 on pivots 50 will occur.

A second general malfunction of prior art boom assemblies in which the central boom section is rigid to the truck is that when the truck tilts laterally, due to uneven or sloping terrain, either outer end of the boom may, due to its great span, tend to dig into the ground, with resultant damage, also as previously described. FIG. 2 shows the truck 2 so tilted to the right. Such tilting may occur either on generally level ground represented by ground line 58A, as when the wheels at one side of the truck fall into a rut or other depression 68 in the ground, or when the truck is driven laterally across sloping terrain, as represented by ground line 58B. If as in prior art structures central boom section 34 were rigid on the truck, and the truck were tilted as on ground line 58A, the outer end of the boom at the "low" side of the truck would drop to a position indicated at 48A in FIG. 2, or even lower, with the immediate danger that it would dig into and its movement arrested by the ground, with resultant damage thereto. This could be avoided by suspending the central boom pivotally from truck on an axis thereabove and extending fore-and-aft of the truck, and attaching chains 52 to members fixed to said central section, so that the entire boom would be swingable about said pivot. The boom would then swing laterally of the truck in response to tilting of the truck, tending to remain horizontal despite said tilting, and thus remain generally parallel to ground line 58A. The end of the boom at the low side of truck would be thereby raised to the position indicated at 48B in FIG. 2. However, the boom end at the high side of the truck would also be correspondingly lowered, with the result that if the truck were tiled by reason of being on sloping terrain represented by ground line 58B, the boom end at the high side of the truck might dig into the ground. In the present structure, the problem is solved by the provision of a boom suspension which provides only a portion of the boom elevation and lowering respectively at the low and high sides of the truck that would have been provided by a single-pivot suspension of the entire boom as mentioned above, preferably about half thereof. Thus the boom end at the low side is elevated sufficiently to clear the ground on level but uneven ground, while the boom end at the high side is lowered but not so far as to engage the ground if the truck is tilted by reason of being on evenly sloping ground. This greatly increases the possible degree of tilt of the truck without digging the ends of a boom of given length into the ground, and also increases the possible span of a boom which can be prevented from digging into ground with a given degree of tilt of the truck, and thus represents a substantial improvement over the prior art.

Considering FIG. 2, it will be seen that when the truck 2 tilts for any reason in either direction, to the right as shown, guide members 22—32 remain vertical, swinging on pivot bolts 26 toward the low side of the truck. Guides 32 being rigidly fixed to central boom section 34, must remain parallel, and thus force said central boom section to remain generally horizontal. Guides 32 fit sufficiently loosely in guides 22 that no binding thereof occurs due to the slight reduction of spacing between guides 22 resulting from their pivotal movement.

This movement extends guide 32 from guide 22 at the high side, with a resultant increase in the tension of the associated spring 36, and telescopes guide 32 into guide 22 at the low side, with a resultant corresponding decrease in the tension of the associated spring 36. However, the two springs are sufficiently close together, their modulus is sufficiently low, and the weight supported thereby is sufficiently great, that central boom section 34 remains substantially horizontal despite the unequal tension of the two springs. Thus central boom section 34 is effectively pivoted on an imaginary axis parallel to and midway between pivot bolts 26. As a result of the pivotal movement of boom section 34 to the right, as shown, pivot 50 of right boom section 48 is moved closer to connection 56 of chain 52 supporting right boom section 48, while pivot 50 and chain connection 56 of left boom section 48 are moved further apart. The chains being of fixed lengths, the movement of pivot 50 and chain connection 56 of the right boom section 48 closer together permits section 48 to pivot downwardly relative to central section 34, so that its outer end is lower than it would have been if section 48 had remained a linear extension of section 34, this position being indicated at 48B, but not as low as it would have been if central boom section 34 had been fixed to frame 12, the latter position being that indicated at 48 A. The outer end of right boom section is therefore effectively elevated, not lowered, with respect to the truck itself. Similarly, the outer end of left boom section 48 is simultaneously lowered with respect to the truck itself. Preferably, as previously mentioned, the actual positions of the outer ends of boom sections 48, in any tilt, should be about midway between positions 48A and 48B, as this provides maximum protection against the boom digging into the ground, whether the truck is tilted by uneven ground represented by line 58A, or sloping ground as indicated by line 58B.

While I have shown and described a specific embodiment of my invention, it will be readily apparent that many minor changes of structure and operation could be made without departing from the spirit of the invention.

What I claim as new and desire to protect by Letters Patent is:

1. A sprayer boom assembly comprising:
   a. a frame;
   b. means for rigidly affixing said frame to a sprayer truck adapted to be driven across the ground and carrying a source of supply of a chemical to be applied to the ground or to crops growing therein;
   c. an elongated boom having spray nozzles spaced along the length thereof and adapted to be operatively connected to said source of chemical supply, said boom being positioned to extend transversely to the line of travel of said truck and laterally outwardly from both sides of said truck, above ground level, and including a central section having its midpoint generally at the midline of said truck and a pair of end sections of equal length pivoted respectively to the opposite ends of said central section for vertical movement relative thereto;
   d. vertically yieldable resilient means suspending said central boom section from said frame; and
   e. a pair of flexible strands each connected at one end to said frame generally above the pivotal connection of one of said end boom sections, and at its opposite end to the adjacent end boom section in spaced apart relation from its pivotal connection to said central section, whereby normally to support said end boom sections in linear alignment with said central section.

2. The assembly as recited in claim 1 wherein said flexible strands are attached to said end boom sections at points thereof spaced outwardly from the centers of gravity thereof.

3. The assembly as recited in claim 2 wherein said suspension means of said central boom section comprises a pair of vertically yieldable springs spaced apart longitudinally of said central boom section, each of said spring having connections at its upper and lower ends respectively to said frame and said central boom section, at least one of said spring connections being vertically adjustable relative to said frame or central boom section whereby said central boom section may be levelled.

4. A sprayer boom assembly comprising:
   a. a frame;
   b. means for rigidly affixing said frame to a sprayer truck adapted to be driven across the ground and carrying a source of supply of a chemical to be applied to the ground of to crops growing therein;
   c. an elongated boom having spray nozzles spaced along the length thereof and adapted to be operatively connected to said source of chemical supply, said boom being positioned to extend transversely to the line of travel of said truck and laterally outwardly from both sides of said truck, above ground level, and including a central section having its midpoint generally at the midline of said truck, and a pair of end sections of equal length pivoted respectively to the opposite ends of said central section for vertical movement relative thereto;
   d. means suspending said central boom section from said frame for effectively free pivotal movement about a horizontal axis transverse to said boom, and disposed above and midway between the ends of said central boom section, whereby said central boom section swings laterally of said truck, and remains generally horizontal, despite tilting of said truck laterally to its line of travel; and
   e. a pair of flexible strands each connected at one end to said frame generally above the pivotal connection of one of said end boom sections, and at its opposite end to the adjacent end boom section in spaced apart relation from its pivotal connection to said central boom section, whereby normally to support said end boom sections in linear alignment with said central section.

5. The assembly as recited in claim 4 wherein said suspension means is additionally resiliently yieldable in a vertical direction, whereby said central boom section may move upwardly or downwardly without pivotal movement.

6. The assembly as recited in claim 5 wherein said suspension means of said central boom section comprises:
   a. a pair of normally vertical upper tubular guides disposed above said central boom section in equally spaced relation at opposite sides of the midpoint thereof, each of said upper guides being pivoted adjacent its upper end to said frame on a horizontal axis transverse to said boom;
   b. a pair of normally vertical lower tubular guides fixed at their lower ends to said central boom section and extending upwardly therefrom into sliding telescopic engagement respectively with the two upper guides; and
   c. a vertically yieldable spring interconnecting each of said upper guides with its associated lower guide.

7. The assembly as recited in claim 6 with the addition of means operable to adjust the tension of said two springs independently.

8. The assembly as recited in claim 6 with the addition of means operable to limit the pivotal movement of said upper guides about their pivotal connections to said frame.